(12) United States Patent
Park et al.

(10) Patent No.: US 10,571,546 B2
(45) Date of Patent: *Feb. 25, 2020

(54) VISION AND RADIO FUSION BASED PRECISE INDOOR LOCALIZATION

(71) Applicant: Intel Corporation, Santa Clara, CA (US)

(72) Inventors: Mi S. Park, Hillsboro, OR (US); Lei Yang, Hillsboro, OR (US); Shao-Wen Yang, Hillsboro, OR (US); Myung Hwangbo, Lake Oswego, OR (US); Shahrokh Shahidzadeh, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,041

(22) Filed: Sep. 26, 2017

(65) Prior Publication Data

US 2018/0196118 A1  Jul. 12, 2018

Related U.S. Application Data

(63) Continuation of application No. 14/865,531, filed on Sep. 25, 2015, now Pat. No. 9,772,395.

(51) Int. Cl.
*H04W 24/00* (2009.01)
*G01S 5/02* (2010.01)
(Continued)

(52) U.S. Cl.
CPC .......... *G01S 5/0263* (2013.01); *G01C 21/206* (2013.01); *G06K 9/00335* (2013.01);
(Continued)

(58) Field of Classification Search
None
See application file for complete search history.

(56) References Cited

U.S. PATENT DOCUMENTS 8,972,357 B2   3/2015  Shim et al.
9,369,982 B2   6/2016  Yang et al.
(Continued)

FOREIGN PATENT DOCUMENTS

WO   2012024516   2/2012
WO   2015143173   9/2015

OTHER PUBLICATIONS

Wikipedia, "Wi-Fi positioning system," https://en.wikipedia.org/wiki/Wi-Fi_positioning_system#cite_note-1, accessed Apr. 17, 2018, 4 pages.

(Continued)

*Primary Examiner* — Erika A Washington
(74) *Attorney, Agent, or Firm* — Hanley, Flight & Zimmerman, LLC (57) ABSTRACT

An embodiment includes at least one computer readable storage medium comprising instructions that when executed enable a system to: receive (a)(i) first radio signal location data for a first object from a radio sensor; and (a)(ii) first visual signal location data for the first object from a camera sensor; perform feature extraction on (b)(i) the first radio signal location data to determine first extracted radio signal features; and (b)(ii) the first visual signal location data to determine first extracted visual signal features; solve a first association problem between the first extracted radio signal features and the first extracted visual signal features to determine first fused location data; and store the first fused location data in the at least one computer readable storage medium. Other embodiments are described herein.

22 Claims, 5 Drawing Sheets

(51) Int. Cl.
*G06T 7/30* (2017.01)
*H04W 4/021* (2018.01)
*G06K 9/00* (2006.01)
*G01C 21/20* (2006.01)
*H04W 4/33* (2018.01)
*G06K 9/62* (2006.01)

(52) U.S. Cl.
CPC ............. *G06K 9/6289* (2013.01); *G06T 7/30* (2017.01); *H04W 4/021* (2013.01); *H04W 4/33* (2018.02)

(56) References Cited

U.S. PATENT DOCUMENTS

| | | | |
|---|---|---|---|
| 9,772,395 B2 * | 9/2017 | Park | G01S 5/0263 |
| 2006/0028552 A1 | 2/2006 | Aggarwal et al. | |
| 2014/0316616 A1 * | 10/2014 | Kugelmass | G05D 1/101 701/8 |
| 2015/0018018 A1 | 1/2015 | Shen et al. | |
| 2015/0092048 A1 * | 4/2015 | Brunner | H04W 4/029 348/135 |
| 2015/0378015 A1 * | 12/2015 | You | G01S 13/06 701/469 |
| 2017/0090007 A1 | 3/2017 | Park et al. | |

OTHER PUBLICATIONS

Wikipedia, "Indoor positioning system," https://en.wikipedia.org/wiki/Indoor_positioning_system, accessed Apr. 17, 2018, 12 pages.
Wikipedia, "Video tracking," https://en.wikipedia.org/wiki/Video_tracking, accessed Apr. 17, 2018, 4 pages.
Wikipedia, "Feature extraction," https://en.wikipedia.org/wiki/Feature_extraction, accessed Apr. 17, 2018, 3 pages.
Wikipedia, "Hungarian algorithm," https://en.wikipedia.org/wiki/Hungarian_algorithm, accessed Apr. 17, 2018, 7 pages.
Wikipedia, "Homography (computer vision)," https://en.wikipedia.org/wiki/Homography_%28computer_vision%29, accessed Apr. 17, 2018, 3 pages.
Betke et al., "Tracking Large Variable Numbers of Objects in Clutter," Department of Computer Science, Department of Biology, Boston University, Department of Mechanical Engineering, Massachusetts Institute of Technology, IEEE 2007, 8 pages.
Goncalves et al., "Multiple Mice Tracking using a Combination of Particle Filter and K-Means," Dom Bosco Catholic University and TecSinapse—Tecnologia da Informacao Ltda, R&D Department, Brazil, 6 pages.
Redzic, Milan, "Dual-sensor fusion for seamless indoor user localisation and tracking," A Dissertation Presented to the Faculty of Engineering and Computing of Dublin City University, Sep. 2012, 182 pages.
Navarro et al., "Wi-Fi Localization Using RSSI Fingerprinting," California Polytechnic State University, San Luis Obispo, CA, 2010, 8 pages.
International Searching Authority, "Written Opinion," issued in connection with application No. PCT/US2016/048540, dated Dec. 1, 2016, 9 pages.
United States Patent and Trademark Office, "Non-Final Office Action," issued in connection with U.S. Appl. No. 14/865,531, dated Nov. 22, 2016, 6 pages.
United States Patent and Trademark Office, "Notice of Allowance," issued in connection with U.S. Appl. No. 14/865,531, dated May 24, 2017, 5 pages.
International Searching Authority, "International Search Report," issued in connection with application No. PCT/US2016/048540, dated Dec. 1, 2016, 3 pages.
Taiwanese Intellectual Property Office, "First Office Action," in connection to Taiwanese Patent Application No. 105125468, dated Nov. 5, 2019, 6 pages.
Taiwanese Intellectual Property Office, "Search Report," in connection to Taiwanese Patent Application No. 105125468, dated Nov. 5, 2019, 2 pages.

* cited by examiner

VISION AND RADIO FUSION BASED PRECISE INDOOR LOCALIZATION

RELATED APPLICATIONS

This patent arises from a continuation of U.S. patent application Ser. No. 14/865,531, filed on Sep. 25, 2015, and entitled "VISION AND RADIO FUSION BASED PRECISE INDOOR LOCALIZATION." U.S. application Ser. No. 14/865,531 is hereby incorporated by reference in its entirety.

TECHNICAL FIELD

Embodiments of the invention concern sensors.

BACKGROUND

With the proliferation of mobile computing nodes and the advance of wireless technologies, the demand for precise indoor localization and its related services is becoming increasingly prevalent. Reliable and precise accurate indoor localization can support a wide range of applications including location-based couponing (where a coupon is delivered to a user based on the user's proximity to a business organization distributing the coupon), friend tracking (allowing one user to know the whereabouts of another user), personal shopping assistants (where information regarding merchandise that is close to a user is displayed or communicated to the user), traffic heat maps, work flow verification and optimization, and the like.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

However, current indoor positioning systems are problematic. For example, such systems are often inaccurate, too complicated to implement, and/or too expensive. For example, many systems either rely on dedicated infrastructure (e.g., ultra-wide band (UWB), visible light), or adaptation and usage of existing communications infrastructure like wireless local area networks (LANs). The installation of new location infrastructure may lead to better accuracy but also leads to significant deployment and maintenance costs. Other solutions that use existing infrastructure (e.g., systems based on Wi-Fi and received signal strength indicator (RSSI) signals) suffer from poor location accuracy with error between 5 m and 30 m. While such error may be acceptable in some situations, it is unacceptable in other situations such, for example, knowing a precise location of a mobile robot or knowing whether a consumer is in front of product A in a grocery store aisle or in front of product B two meters further down the same aisle.

To address the problem, embodiments described herein address multimodal location fusion systems that provide sub-meter accurate (within one meter of accuracy) indoor localization by detecting and tracking moving objects (e.g., fork lifts, flying drones, mobile robots, animals, humans) radio and visual sensors. Such embodiments utilize some or all available sensors at a location, without demanding extra hardware, to provide highly accurate localization based on integrating radio-based and visual-based signals accentuating the strengths of each modality while de-accentuating the weaknesses of each modality.

In addressing the problem, embodiments address at least three issues: (1) how to provide a sub-meter level location accuracy without demanding additional/excessive hardware, (2) how to effectively interact with different sensor modalities, and (3) how to enhance individual sensor pipelines with help from other sensors in a way that leads to overall system performance improvement.

Regarding issue (1), commonly found infrastructure sensors (e.g., surveillance cameras, Wi-Fi, radio frequency identification (RFID)) may be leveraged in various embodiments to provide greater localization accuracy without adding a great deal of infrastructure. Such embodiments "fuse" or combine output from such sensors by integrating electronic and visual signals and then associating an object's electronic identifier (found in many radio signals) and its highly accurate localization (achieved with visual tracking systems) to provide a fused location that is not only accurate to within 1 meter of an object but that also correctly identifies the object (something visual tracking systems struggle with). Such visual signals are easily extracted from surveillance cameras found in stores, warehouses, homes, and the like.

Regarding issue (2), embodiments successfully interact with different sensory modalities (e.g., vision and radio) and use high-level temporal-spatial features (e.g., trajectory patterns and shape), instead of raw measurement data. By interacting with radio and visual data in its commonly output and already processed form, the implementation of embodiments is streamlined, more flexible, and can be integrated with different vision based and radio based location pipelines without modifications (or with relatively few modifications).

Regarding issue (3) the interactions described above are targeted to leverage the best attributes of the different modalities. For instance, radio signals have unique identifiers (e.g., sender_ID or device_ID included within a radio data packet) and relatively high precision in terms of trajectory patterns. However, radio signals are often broadcast relatively infrequently (low frequency) so suffer from poor location accuracy. Further, radio signals can leverage the unique identifiers to accurately determine the number of users/radio broadcasters in a given space. As a result, radio is an excellent way to detect and track multiple moving objects. In contrast, visual signals have high localization accuracy and are output relatively frequently (high frequency). However, visual signals have difficulty correctly identifying moving objects that may occlude one another. Such visual tracking programs incorrectly connect multiple objects when those objects near one another. Thus occurs due to lighting issues (e.g., shadow) and occlusions. To address the limitation of vision algorithms, embodiments apply clustering techniques to remove shadow and/or group segments of a person and then combine that improved visual output with radio based accurate determinations of the IDs of users in the video frame. Thus, IDs stay with their correct objects even when those objects start apart from each other, near each other, and then move away from each other. Such as scenario is addressed more fully with regard to FIG. 3. Therefore, understanding characteristics of different sensor modalities and fusing the best of those characteristics provide advantages to embodiments.

Figure 1:
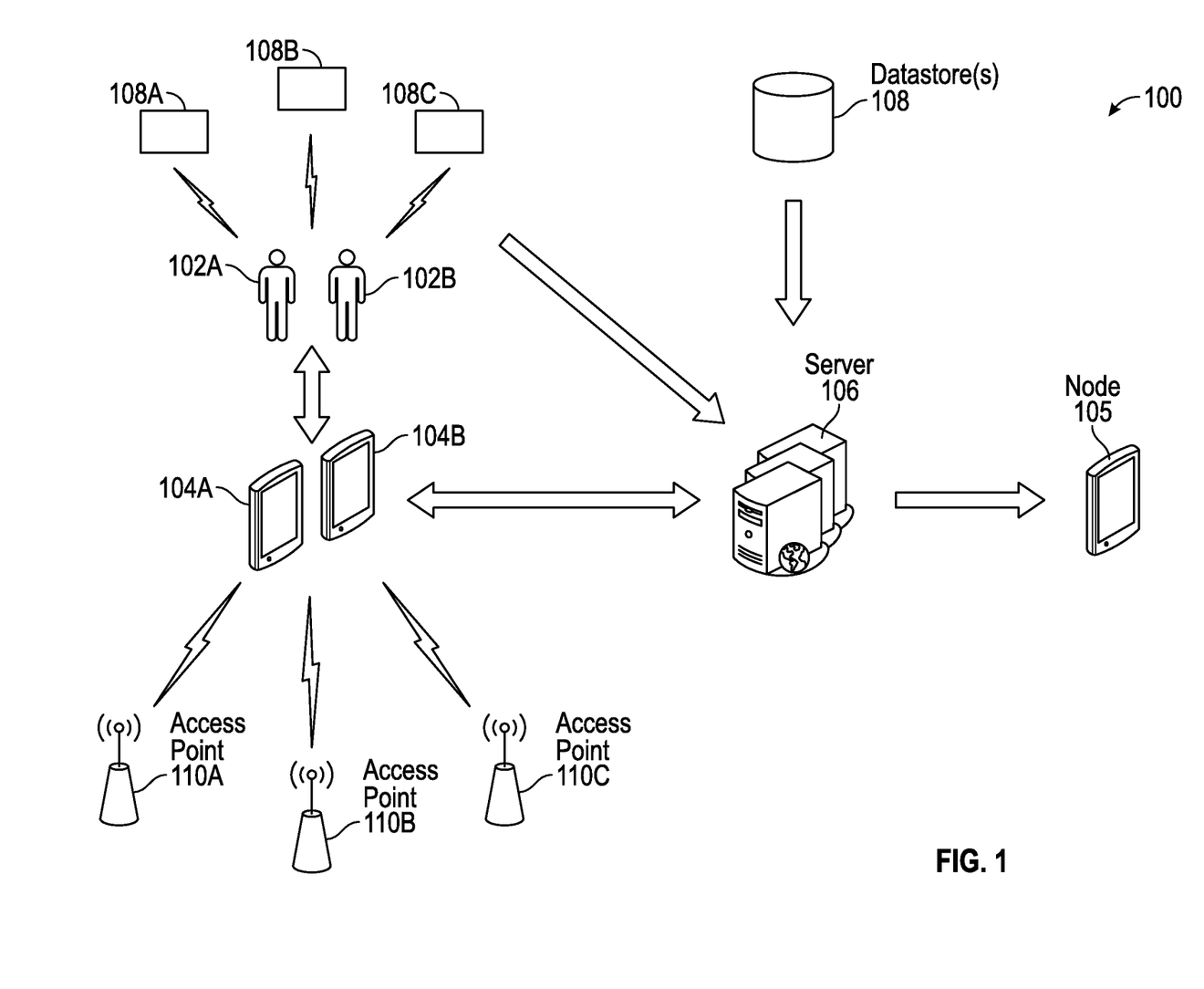
FIG. 1 depicts a localization system in an embodiment.

FIG. 1 depicts a localization system in an embodiment. Mobile computing nodes 104A, 104B (such as the node of FIG. 4) correspond to users 102A, 102B. The mobile devices 104A, 104B may include any suitable processor-driven computing device including, but not limited to, a desktop computing device, a laptop computing device, a server, a smartphone, a tablet, and so forth. For ease of explanation, at times herein only one of devices 104A, 104B is described however the explanation regarding 104A is applicable to 104B and vice versa.

The mobile devices 104A, 104B may communicate with one or more access points 110A, 110B, 110C (sometimes collectively referred to herein as 110). Each access point 110A, 110B, 110C may be configured with a unique identifier and, optionally, additional information about the access points. The access points 110 may provide wireless signal coverage for an area. Mobile device 104A may capture measurements associated with the communication between the mobile device and the access points 110. The measurements may include received signal strength indicators (RSSIs), each of which is a measurement of the power present in a received radio signal. The measurements may be transmitted to a server 106 (such as the node of FIG. 5). Although embodiments are described herein in the context of Wi-Fi networks for the access points 110A, 110B, 110C, other embodiments may utilize other wireless technologies, including but not limited to Bluetooth, BLE, RFID, UWB, ZigBee, cellular signals, and the like.

The server 106 may also communicate with one or more image capture devices 108A, 108B, 108C (e.g., cameras), which capture images of objects (e.g., users 102A, 102B). The server may also receive data from one or more datastores 108, such as floor map information for a specific location and/or access point radio fingerprint data associated with the one or more access points 110.

Radio fingerprinting data may include information that identifies the one or more access points 110 or any other radio transmitter by the unique "fingerprint" that characterizes its signal transmission. An electronic fingerprint makes it possible to identify a wireless device by its unique radio transmission characteristics. The location accuracy from radio fingerprinting may depend on environment factors such as the density of the access points, the relative placement of the access points, and the temporal/spatial variations of Wi-Fi signals.

The server 106 may determine a current location of the mobile devices 104A, 104B (and users 102A, 102B) based at least in part on the visual data, measurement data RSSI conveyed to mobile devices 104A, 104B, access point fingerprint data, and/or floor map information. The location may be used to provide location-based services to the identified mobile device 104 and/or another computing node 105.

Figure 2:
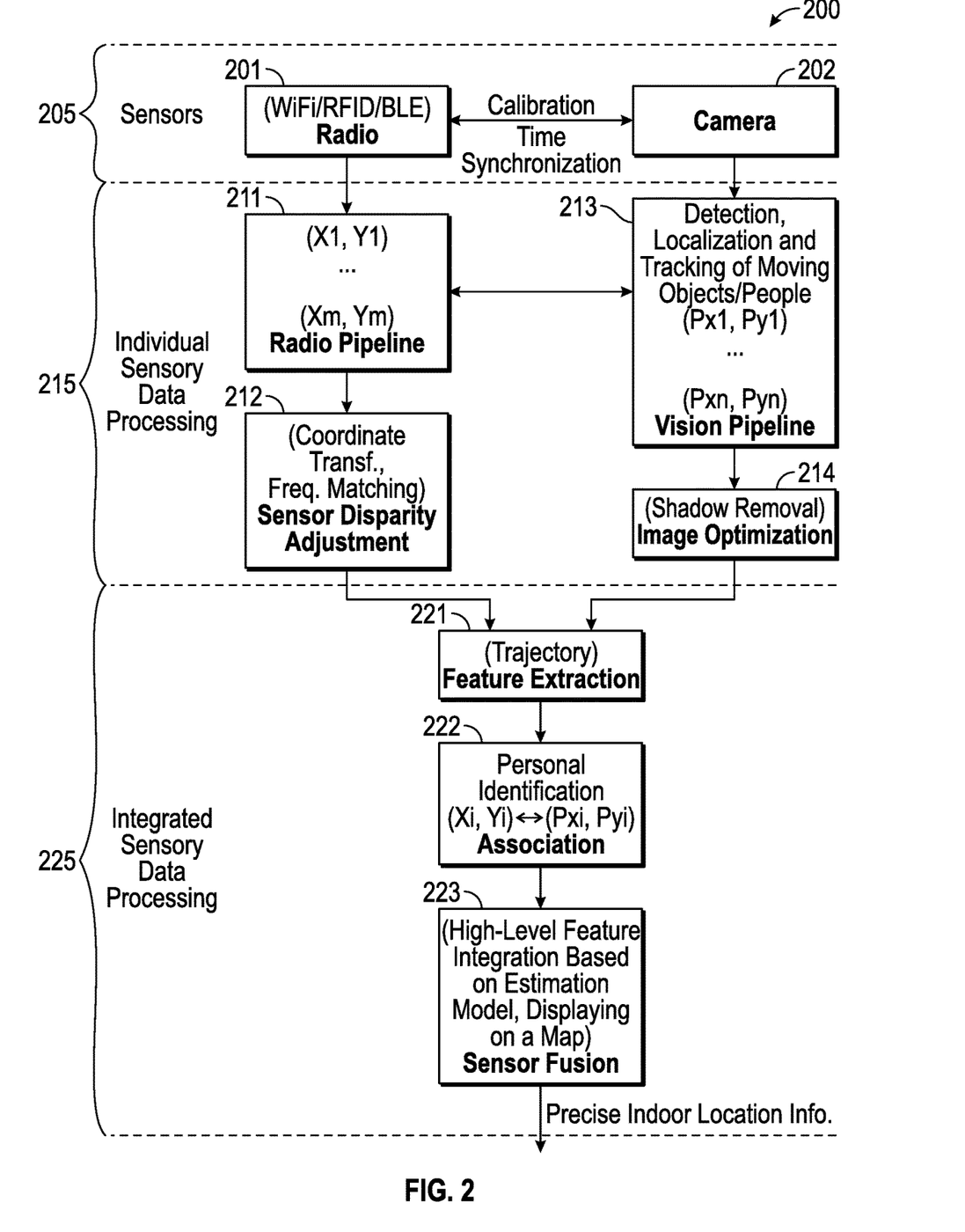
FIG. 2 depicts a process in an embodiment.

FIG. 2 depicts a process in an embodiment. Process 200 includes three main parts: preliminary sensor activity 205, individual sensory data processing 210, and integrated sensory data processing 215.

In process portion 205, a radio sensor (e.g., Wi-Fi device, RFID device, BLE device) 201 performs calibration and time synchronization with a visual sensor (e.g., image capture device such as a surveillance camera) 202. For example, devices 201, 202 may use the Network Time Protocol (NTP) protocol to time-synchronize with one another.

In process portion 215, location data from each modality pipeline (i.e., radio and visual) are processed in parallel (but that is not mandatory in all embodiments).

For example, at block 211 server 106 may receive data from a mobile device 104. In some embodiments, the data received may include wireless data measurements associated with the mobile device 104 and one or more access points 110. In some embodiments, the wireless data measurements may be RSSI data. At block 211 server 106 may retrieve radio fingerprinting data associated with the one or more access points 110. The radio fingerprint data may be retrieved from one or more datastores 108. In some embodiments, the server 106 may also retrieve one or more maps for an area where the mobile device 104 is generally located. At block 211 coordinates Xm, Ym may be determined for m mobile devices 104 identified.

An embodiment employs RSSI as well as number of detected Wi-Fi access points for generating the Wi-Fi fingerprinting. However, not all embodiments are limited to RSSI fingerprinting technique, and other Wi-Fi location techniques (e.g., RSSI triangulation, Time of Flight trilateration) may be used as well. Also, some embodiments blend data from various radio sources such as combining Wi-Fi with RFID or BLE data.

Block 212 concerns sensor disparity adjustment. Such adjustments include, for example, frequency matching between radio 201 and camera 202. For example, for frequency disparity between the sensors an embodiment associates data from radio 201, camera 202 based on the closest timestamps between the devices. For example, a camera may capture 29 frames per second but only 1 Wi-Fi signal is produced every 3 to 4 seconds.

Block 212 also concerns coordinate transformation between radio 201 and camera 202. Since every sensor speaks its own language, an embodiment determines a common language for the sensors 201, 202. For example, Wi-Fi signals (from radio 201) may be measured in the world coordinate system, while visual signals (from camera 202) are measured in pixel coordinate system. Before integrating different sensory data in process portion 225, an embodiment converts one set of coordinates (Xn,Yn coordinates from radio 201 or Pxn, Pyn coordinates for camera 202) to another set of coordinates. An embodiment may use, for example, a Homography transformation matrix for coordinate transformation. Both radio and visual coordinates may both be transformed to a common coordinate system in some embodiments. An embodiment uses pixel coordinates as a reference coordinate for effective trajectory pattern matching in the association block (block 222), since when converting pixel to the world coordinate a small off pixel error can be interpreted as a huge difference in the world coordinate system (especially for the those pixels near vanishing points in a frame).

Block 213 concerns vision tracking to determine visual coordinates. An embodiment tracks motion based on two phases: (a) detecting moving objects in each frame using a background subtraction algorithm (e.g., based on Gaussian mixture model), and (b) associating the detections corresponding to the same object over time using a Kalman filter. This type of tracking alone may not be sufficient. Real world scenarios may include people walking closely to each other or making sudden changes in walking direction. Such cases are difficult to track and continuously assign a correct ID to an object. For example, tracking Mouse1 and Mouse2 in a cage may be relatively easy for visual tracking systems provided the mice do not touch. However, when the mice interact and one occludes another, the tracking system that had applied "Object1" to Mouse1 and "Object2" to Mouse2 may now mistakenly apply "Object1" to Mouse2. Many visual tracking systems further connect separate people through shadows that couple the people together. Such systems sometimes break a single person into multiple objects due to occlusions.

Being aware of these current limitations, an embodiment applies clustering techniques to a group of segments of a person together or removes shadows based on the knowledge of already identified radio IDs obtained from radio data from radio 201. Since the embodiment would know how many people should be in the visual scene from number of electronic IDs, the embodiment can apply K-means clustering to the object (where K equals the number of electronic identifiers) to group segments together (block 214). After finding distinct groups, if there is a shadow, 2-means clustering can be applied to each distinct group to remove the shadow; one cluster for an object and the other is for its cast shadow. Centroid and moment of inertial of an object together can determine the existence of moving shadow.

In process portion 225, integration or fusion of the disparate radio and visual location data is performed. As mentioned above, radio signal based location tracking gives reliable overall movement estimations over a time window (e.g., trajectory patterns, direction of movement), but each location estimate may have error of a few meters due to the inherent Wi-Fi signal variations. Visual signal based object tracking provides high localization accuracy (e.g. sub-meter), but often is confused between multiple objects and/or reports an incorrect number of objects due to factors such as shadowing, object obstruction or crowded scenes.

Portion 225 may occur at server 106 to provide a user trajectory by fusing the trajectories of radio (Wi-Fi) and vision with a floor map. While in some embodiments, portion 215 is handled separately (e.g., coordinates are determined on a smart phone and within a camera system) in other embodiments those tasks are handled by server 106 and/or by one of devices 201, 202 or by some other node.

Block 221 includes extracting trajectory features in each time window (e.g., frame). An embodiment begins feature extraction an initial set of measured data and builds derived values (features) intended to be informative and non-redundant. Feature extraction is related to dimensionality reduction. When the input data to an algorithm is too large to be processed and it is suspected to be redundant (e.g., repetitiveness of images presented as pixels), then it can be transformed into a reduced set of features (also named a "feature vector"). The extracted features are expected to contain the relevant information from the input data, so that tracking is more easily performed. Features may vary and may include trajectory, shape, color, and the like.

Block 222 includes solving an association or assignment problem. An assignment problem consists of finding a maximum weight matching (or minimum weight perfect matching) in a weighted bipartite graph. Thus, in block 222 the task is to correlate a camera based coordinate (tied to electronic ID) to a likely more accurate (but improperly identified) vision based coordinate. An embodiment forms this association using a Hungarian optimization algorithm, which finds the minimum cost assignment based on Euclidean distance and a cost matrix, to map electronic identifiers of objects to visual appearances of those same objects. Therefore, the vision pipeline may produce an incorrectly assigned ID of a moving object in a time window. This misidentification may be corrected by solving the association problem.

As a result, the location of a moving object taken from the visual location data can be used as an output location, because visual signals are more accurate (<1 m) in localization (block 223). Furthermore, the fused location data may be displayed on a display to a user or otherwise communicated. By solving the association problem, an embodiment fixes the object tracking/detection errors while still maintain the sub-meter tracking accuracy from vision solutions.

In an embodiment, the location output can be further fed into an adaptive particle filter framework. When a floor map is available an embodiment can leverage floor map constraints to correct location errors and speed up the convergence of relative confidence estimation.

Regarding particle filters, an embodiment employs particle filter (also known as Sequential Monte Carlo (SMC)) methods to estimate the location (i.e., planar coordinates and/or heading orientation) of an object. Particle filtering or SMC methods may be on-line posterior density estimation algorithms to estimate the posterior density of a state-space by directly implementing Bayesian recursion equations. Particle filtering may utilize a discretization approach, using a set of particles to represent the posterior density. Particle filtering may provide a methodology for generating samples from the required distribution without requiring assumptions about the state-space model or the state distributions. The state-space model may be non-linear and the initial state and noise distributions may take any form required. Particle filtering may implement the Bayesian recursion equations directly by using an ensemble based approach. The samples from the distribution may be represented by a set of particles. Each particle may be associated with a weight that represents the probability of that particle being sampled from the probability density function. Weight disparity leading to weight collapse may be mitigated by including a resampling step before the weights become too uneven. In the resampling step, the particles with negligible weights may be replaced by new particles in the proximity of the particles with higher weights.

In some embodiments, particle filtering may be used to track the locations of particles and track the relative confidence between the radio fingerprint location and the visual location tracking. When a floor map is available, floor map constraints may be leveraged to speed up the convergence of relative confidence estimation.

A sensor update may involve particles that are weighted by the measurements taken from additional sensors. Sensor update may use the wireless signal strengths (e.g., RSSI), the radio fingerprint database, and the floor plan map (if available) to calculate the weight of a particle. For example, a particle may be penalized if its location is within the wall or if the fingerprint does not match the fingerprint database. For resampling, while the particle filtering reiterates, the set of particles may degenerate and not be able to effectively represent a distribution due to the significant difference in weighting among particles. Resampling is a means to avoid the problem of degeneracy of the algorithm. It is achieved by subsampling from the set of particles to form another set to represent the exact same distribution.

Thus, process 200 also provide for the server updating a location estimate that is represented by a set of particles with the wireless data measurements received from the mobile device 104. In some embodiments, the location for each of the particles may be based at least in part on the radio fingerprinting data and visual data associated with the mobile device 104.

A fusion engine may calculate a respective weight for the respective location for each of the plurality of particles. In some embodiments, the fusion engine may calculate a respective penalty associated with the respective location for each of the plurality of particles.

In some embodiments, the fusion engine may calculate a weight associated with the determined location for each of the particles based at least in part on radio fingerprint data and the respective weight for each of the determined locations for each of the particles.

The fusion engine may determine whether the particles are degenerated. If the particles are not degenerated, then the method may reiterate and/or end. In some embodiments, the fusion engine may determine the particles are degenerated based at least in part on the calculated weight associated with the particles. If the fusion engine determines that the particles are degenerated, then the fusion engine may initiate a resampling of at least a portion of the wireless data measurements. Resampling may include requesting additional wireless data measurements and additional visual data associated with the mobile device 104 from the mobile device 104 and iterating through the method.

Returning to process portion 225, an embodiment receives processed data from the radio 201 and camera 202 nodes. For example, devices 201, 202 may typically produce raw measurement data for Wi-Fi (e.g., device_ID, RSSI, timestamp) and other raw measurement data for vision (e.g., vision-assigned ID, pixel location, timestamp) per each signal. The format of the processed data, however, would be different for Wi-Fi (device ID, X, Y, timestamp) and vision (vision-assigned ID, X, Y, timestamp). An embodiment examines the sequences of traces (radio and visual) in a time window and fuses them with map constraints. An embodiment may look at a sequence of traces to allow the embodiment to derive additional data properties from both Wi-Fi and vision (e.g., direction of movement).

Figure 3A:
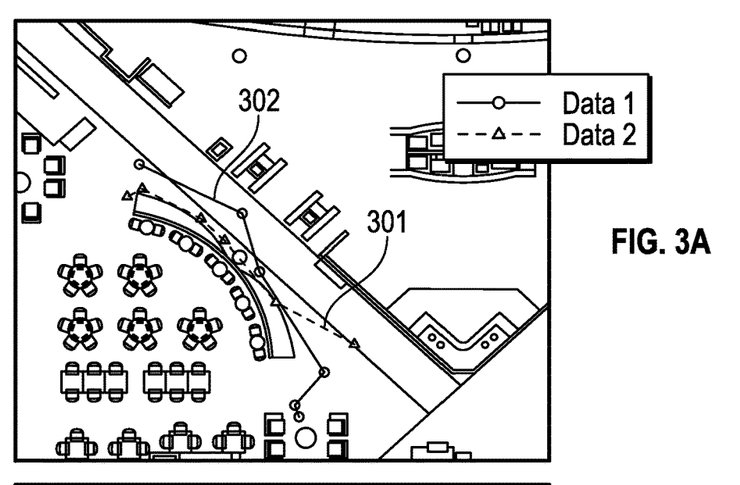
FIG. 3A depicts radio based tracking.
Figure 3B:
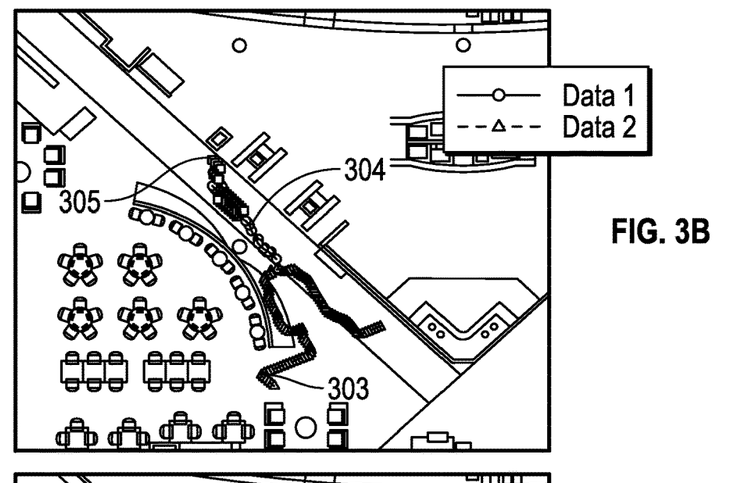
FIG. 3B depicts vision based tracking.
Figure 3C:
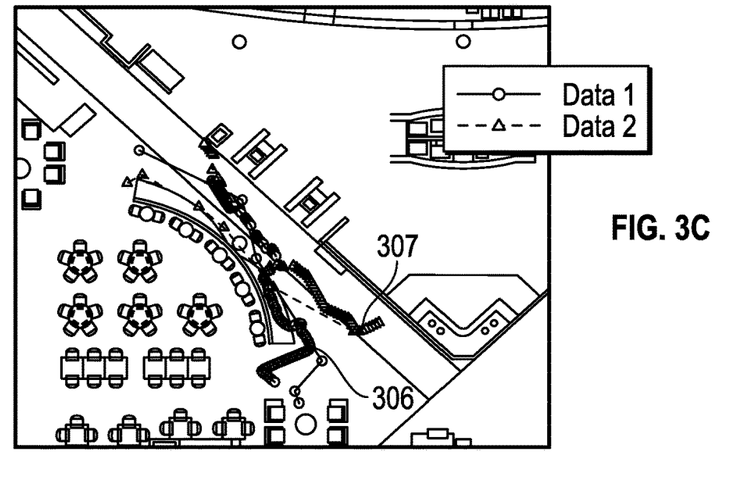
FIG. 3C depicts radio/vision fusion based tracking in an embodiment of the invention.

FIG. 3A depicts radio based tracking, FIG. 3B depicts vision based tracking, and FIG. 3C depicts radio/vision fusion based tracking. A stationary camera (such as a surveillance camera) was used to track two people, moving in opposite directions, at a cafe. In FIG. 3A Wi-Fi tracks paths 301, 302 and does not get confused when those paths near each other at their midpoints, but the location data is not very specific. In FIG. 3B visual tracking shows great granularity or detail but confuses the paths identifying paths 303, 304, 305 when there are only two objects moving. Furthermore, an identity switch incorrectly occurs for path 303. FIG. 3C shows results based on fusion of radio and vision tracking to properly identify the two paths 306, 307 for two objects while doing so with granularity and precision. This occurred after solving the association problem. The fusion embodiment corrected the improperly switched IDs of FIG. 3B and provides sub-meter accurate location information.

Thus, embodiments described herein provide precise indoor localization by intelligently fusing different sensory modalities and leveraging existing infrastructure vision and radio sensors without additional hardware. Since the proposed multimodal fusion embodiments are highly accurate and cost-efficient localization solutions, they can be used in a wide range of internet-of-things (IoT) applications.

Figure 4:
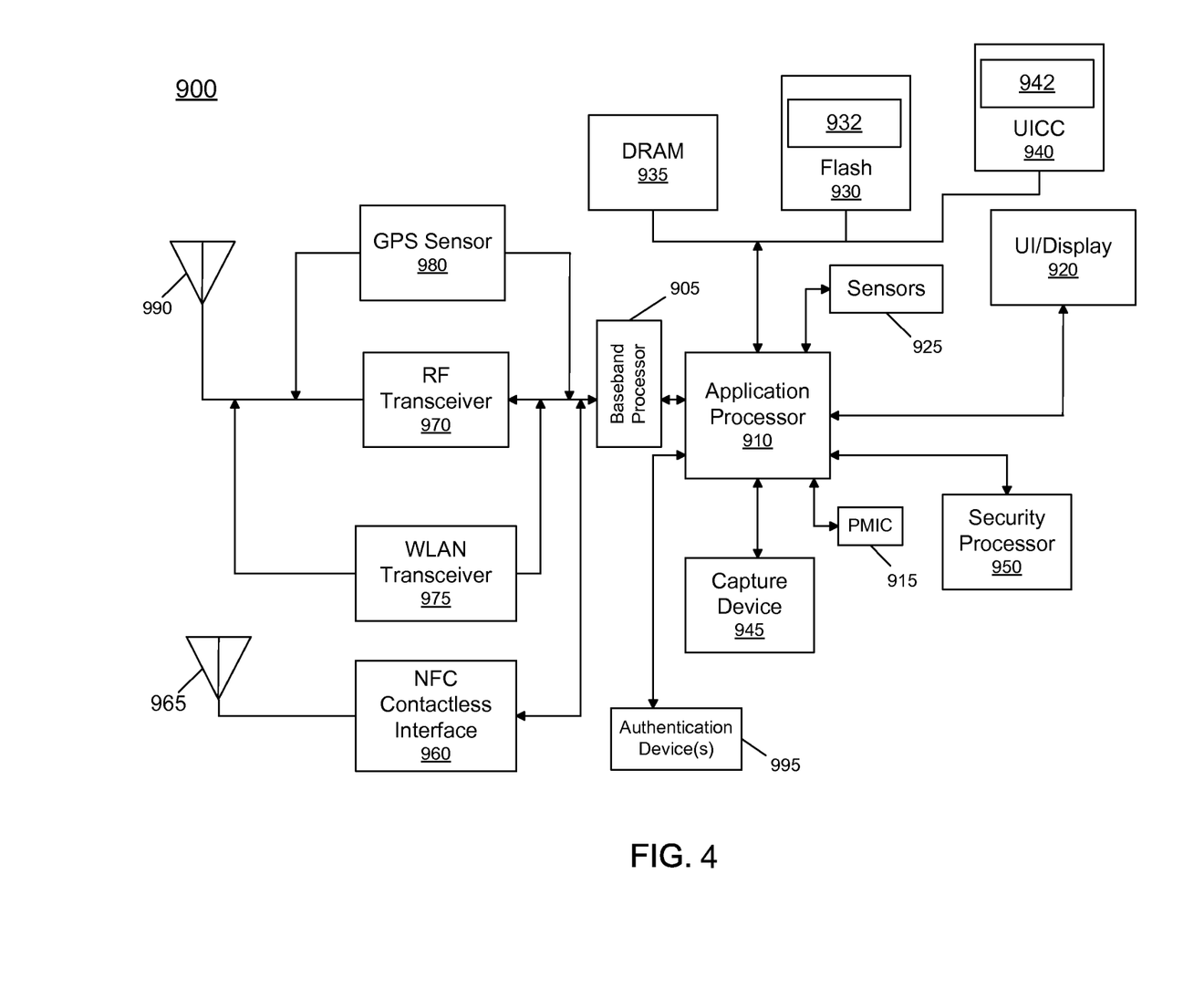
FIG. 4 includes a system for use with an embodiment of the invention.

Referring now to FIG. 4, shown is a block diagram of an example system with which embodiments (such as mobile nodes 104) can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices (e.g., camera) that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
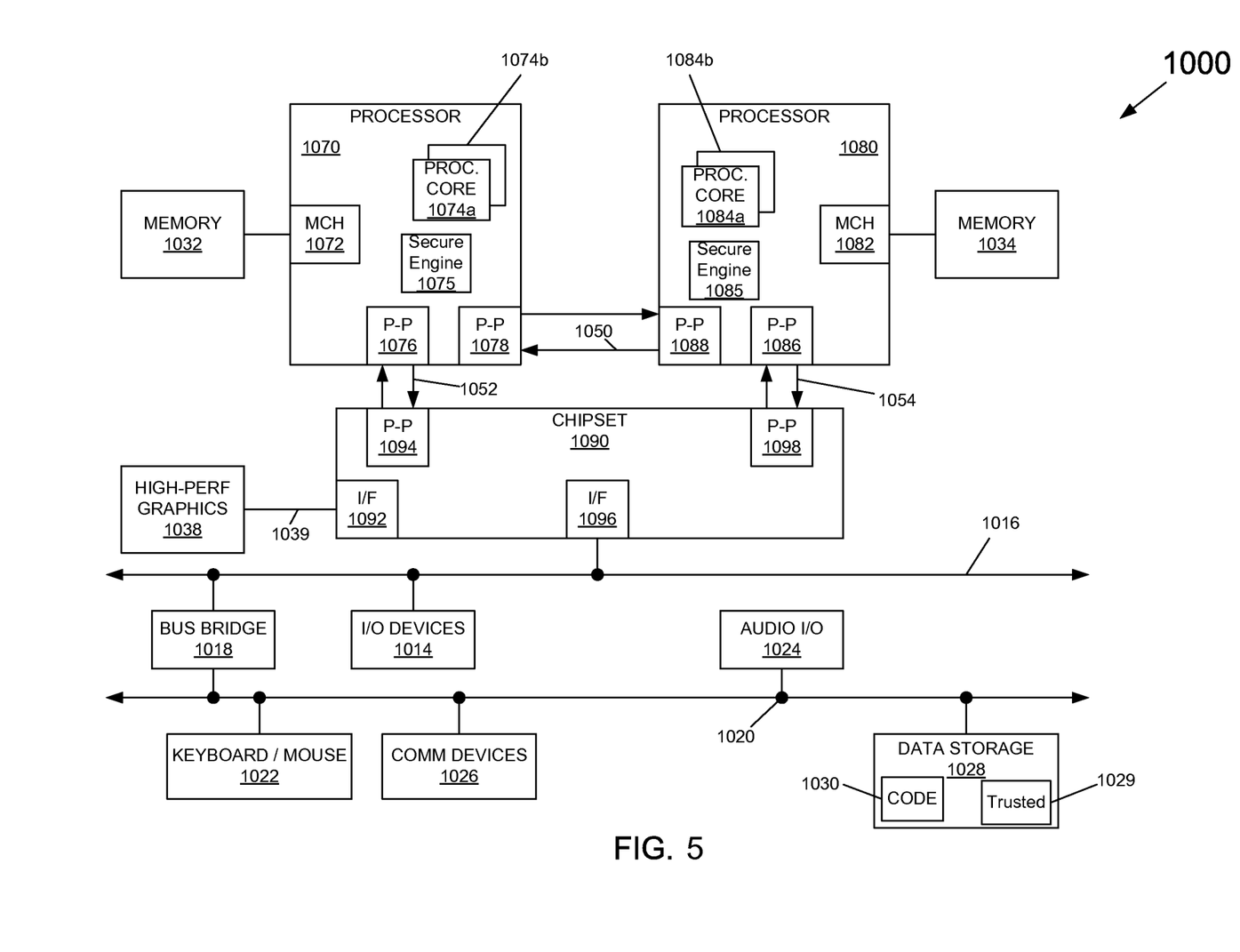
FIG. 5 includes a system for use with an embodiment of the invention.

Referring now to FIG. 5, shown is a block diagram of a system (e.g., server 106) in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

For example, a "location fusion" module or engine may include the above hardware, software, firmware, or a combination configured (programmed or designed) to fuse certain aspects of visual and radio location data together to form a fused location information.

As used herein a "server" is both a running instance of some software that is capable of accepting requests from clients, and the computer that executes such software. Servers operate within a client-server architecture, in which "servers" are computer programs running to serve the requests of other programs, the "clients". This may be to share data, information or hardware and software resources. Examples of typical computing servers are database server, file server, mail server, print server, web server, gaming server, and application server. The clients may run on the same computer, but may connect to the server through a network. In the hardware sense, a computer primarily designed as a server may be specialized in some way for its task. Sometimes more powerful and reliable than standard desktop computers, they may conversely be simpler and more disposable if clustered in large numbers.

Example 1a includes at least one computer readable storage medium comprising instructions that when executed enable a system to: receive (a)(i) first radio signal location data for a first object from a radio sensor; and (a)(ii) first visual signal location data for the first object from a camera sensor; perform feature extraction on (b)(i) the first radio signal location data to determine first extracted radio signal features; and (b)(ii) the first visual signal location data to determine first extracted visual signal features; solve a first association problem between the first extracted radio signal features and the first extracted visual signal features to determine first fused location data; and store the first fused location data in the at least one computer readable storage medium.

In example 2a the subject matter of Example 1a can optionally include the at least one computer readable storage medium further comprising instructions that when executed enable the system to display a location of the first object based on the first fused location data.

In example 3a the subject matter of Examples 1a-2a can optionally include the at least one computer readable storage medium further comprising instructions that when executed enable the system to apply a particle filter to the first fused location data to determine first filtered fused location data.

In example 4a the subject matter of Examples 1a-3a can optionally include the at least one computer readable storage medium further comprising instructions that when executed enable the system to apply the particle filter to the first fused location data based on a site map for a physical site corresponding to the first radio signal location data, the first visual signal location data, and the first object.

In example 5a the subject matter of Examples 1a-4a can optionally include the at least one computer readable storage medium wherein the first radio signal location data and the first visual signal location data both correspond to a common coordinate system.

In example 6a the subject matter of Examples 1a-5a can optionally include wherein the first radio signal location data is time synchronized to the first visual signal location data.

In example 7a the subject matter of Examples 1a-6a can optionally include the at least one computer readable storage medium further comprising instructions that when executed enable the system to determine the first fused location data based on associating a first electronic identifier, corresponding to the first radio signal location data, with the first visual signal location data.

In example 8a the subject matter of Examples 1a-7a can optionally include the at least one computer readable storage medium further comprising instructions that when executed enable the system to perform the feature extraction to extract trajectory data for the first object based on the first visual signal location data; wherein the trajectory data is included in the first extracted radio signal features.

In example 9a the subject matter of Examples 1a-8a can optionally include the at least one computer readable storage medium further comprising instructions that when executed enable the system to: receive (a)(i) second radio signal location data for a second object from the radio sensor; and (a)(ii) second visual signal location data for the second object from the camera sensor; perform feature extraction on (b)(i) the second radio signal location data to determine second extracted radio signal features; and (b)(ii) the second visual signal location data to determine second extracted visual signal features; solve a second association problem between the second extracted radio signal features and the second extracted visual signal features to determine second fused location data; and store the second fused location data in the at least one computer readable storage medium; wherein the first and second visual signal location data corresponds to a single frame of video data.

In example 10a the subject matter of Examples 1a-9a can optionally include the at least one computer readable storage medium further comprising instructions that when executed enable the system to reassign a first electronic identifier from the second object to the first object based on the solving the first and second association problems.

In example 11a the subject matter of Examples 1a-10a can optionally include the at least one computer readable storage medium further comprising instructions that when executed enable the system to: determine the first fused location data based on associating a first electronic identifier, corresponding to the first radio signal location data, with the first visual signal location data; and determine the second fused location data based on associating a second electronic identifier, corresponding to the second radio signal location data, with the second visual signal location data.

In example 12a the subject matter of Examples 1a-11a can optionally include the at least one computer readable storage medium further comprising instructions that when executed enable the system to conduct k-means clustering on video data corresponding to the first and second visual signal location data, wherein "k" is based on the first and second electronic identifiers.

In example 13a the subject matter of Examples 1a-12a can optionally include the at least one computer readable storage medium wherein the first and second visual signal location data correspond to an occlusion with one of the first and second objects occluding another of the first and second objects.

In example 14a the subject matter of Examples 1a-13a can optionally include the at least one computer readable storage medium wherein the first radio signal location data is based on at least one of received signal strength indicator (RSSI) fingerprinting, RSSI triangulation, and Time Of Flight trilateration.

In example 15a the subject matter of Examples 1a-14a can optionally include the at least one computer readable storage medium wherein the first radio signal location data includes first coordinate data and the first visual signal location data includes second coordinate data.

In example 16a the subject matter of Examples 1a-15a can optionally include the at least one computer readable storage medium wherein the first radio signal location data includes a first device identifier (ID) for the first object and a first time stamp and the first visual signal location data includes a second time stamp.

In example 17a the subject matter of Examples 1a-16a can optionally include the at least one computer readable storage medium further comprising instructions that when executed enable the system to solve the first association problem based on a least cost optimization between the first extracted radio signal features and the first extracted visual signal features.

In example 18a the subject matter of Examples 1a-17a can optionally include the at least one computer readable storage medium further comprising instructions that when executed enable the system to communicate a first message to a first mobile computing node in response to determining the first fused location data.

Such a message may include, for example, a coupon or advertisement that is specific to the fused location data (e.g., a coupon for product X located within 1 m of the tracked object). However, other actuations based on the fused data are possible. Those actuations may be virtual or physical. For example, an actuation signal may be sent to a solenoid coupled to a gate when an object, having a recognized or whitelisted device_id, is tracked and determined to be within a threshold distance of the gate. For example, an virtual avatar may be projected to a user's virtual reality headset when the user, having a recognized or whitelisted device_id, is tracked and determined to be within a threshold distance of a location. Other actuations may include displaying privileged data to a user's mobile computing device (e.g., smartphone, wireless spectacles with a video display) when an embodiment determines the user is near a designated location.

In example 19a the subject matter of Examples 1a-18a can optionally include the at least one computer readable storage medium wherein the first fused location data includes a first electronic identifier included in the first radio signal location data and first coordinate data included in the first visual signal location data.

Example 20a includes at least one computer readable storage medium comprising instructions that when executed enable a system to: receive (a)(i) first location data, corresponding to a first object, from a radio sensor; and (a)(ii) second location data, corresponding to the first object, from a camera sensor; obtain extracted features based on features from the first and second location data; and determine fused location data that (b)(i) is based on the extracted features, and (b)(ii) includes an electronic identifier included in the first location data and coordinate data included in the second location data.

Thus, in some embodiments the feature extraction may occur apart from the computing node that determines (e.g., obtains, derives, calculates) the fused data.

Another version of example 20a includes at least one computer readable storage medium comprising instructions that when executed enable a system to: receive (a)(i) first location data, corresponding to a first object, from a radio sensor; and (a)(ii) second location data, corresponding to the first object, from a camera sensor; obtain extracted features based on features from the first and second location data; and determine fused location data that (b)(i) is based on the extracted features, (b)(ii) includes an electronic identifier based on an identifier included in the first location data, and (b)(iii) includes coordinate data based on second coordinate data included in the second location data.

Thus, the electronic identifier of the fused data may merely be the same identifier that was in the first location data, an additional instance of the same identifier that was in the first location data, or may be derived from identifier in the first location data. The coordinate data of the fused data may be the same coordinate data that is in the second location data, an instance thereof, or may be derived coordinate data in the second location data.

In example 21a the subject matter of Example 20a can optionally include the at least one computer readable storage medium, wherein the first location data and the second location data both correspond to a common coordinate system.

In example 22a the subject matter of Examples 20a-21a can optionally include the at least one computer readable storage medium, wherein the first location data includes first coordinate data.

In example 23a the subject matter of Examples 20a-22a can optionally include wherein the identifier included in the first location data includes a device identifier (ID) for the first object.

For example, the device ID may include a unique identifier for a device, such as a mobile computing node, that is included in a field of a container that includes or corresponds to the first location data.

Example 24a include an apparatus comprising: at least one memory and at least one processor, coupled to the at least one memory, to perform operations comprising: receiving (a)(i) first location data, corresponding to a first object, from a radio sensor; and (a)(ii) second location data, corresponding to the first object, from a camera sensor; obtaining extracted features based on features from the first and second location data; and determining fused location data that (b)(i) is based on the extracted features, and (b)(ii) includes an electronic identifier in the first location data and coordinate data in the second location data.

Another version of example 24a includes an apparatus comprising: at least one memory and at least one processor, coupled to the at least one memory, to perform operations comprising: receiving (a)(i) first location data, corresponding to a first object, from a first sensor having a first sensing modality; and (a)(ii) second location data, corresponding to the first object, from a second sensor having a second sensing modality unequal to the first sensing modality; obtaining extracted features based on features from the first and second location data; and determining fused location data that (b)(i) is based on the extracted features, (b)(ii) includes an electronic identifier based on an identifier included in the first location data, and (b)(iii) includes coordinate data based on second coordinate data included in the second location data.

In example 25a the subject matter of Example 24a can optionally include wherein (c)(i) the first location data includes first coordinate data; and (c)(ii) the identifier included in the first location data includes a device identifier (ID) corresponding to the first object.

Example 1b includes an apparatus comprising: at least one memory and at least one processor, coupled to the at least one memory, to perform operations comprising: receiving (a)(i) first location data, corresponding to a first object, from a first sensor having a first sensing modality; and (a)(ii) second location data, corresponding to the first object, from a second sensor having a second sensing modality unequal to the first sensing modality; obtaining extracted features based on features from the first and second location data; and determining fused location data that (b)(i) is based on the extracted features, and (b)(ii) includes an electronic identifier in the first location data and coordinate data in the second location data.

In example 2b the subject matter of Example 1b can optionally include wherein (c)(i) the first location data includes first coordinate data and the second location data includes second coordinate data; (c)(ii) the first location data includes a device identifier (ID) corresponding to the first object; and (c)(iii) the first sensor includes a radio sensor and the second sensor includes a vision sensor.

For example, the first modality may include WiFi or other radio based sensing (BLE, RAIN RFID, NFC) while the second modality includes vision tracking, sound tracking (e.g., sonar), and the like. As used herein, "camera" includes image capture devices in general. Such image capture devices include still frame cameras, video cameras, thermographic cameras (e.g., infrared cameras, thermal imaging cameras, and image capture devices that use heat vision), and the like. Cameras and "vision" as used herein are not limited to vision within visible light wavelengths.

Example 1c includes an apparatus comprising: at least one memory and at least one processor, coupled to the at least one memory, to perform operations comprising: receiving (a)(i) first radio signal location data for a first object from a radio sensor; and (a)(ii) first visual signal location data for the first object from a camera sensor; performing feature extraction on (b)(i) the first radio signal location data to determine first extracted radio signal features; and (b)(ii) the first visual signal location data to determine first extracted visual signal features; solving a first association problem between the first extracted radio signal features and the first extracted visual signal features to determine first fused location data; and storing the first fused location data in the at least one computer readable storage medium.

Another version of Example 1c includes an apparatus comprising: at least one memory, at least one processor, a location fusion module, an feature extraction module, and all coupled to the at least one memory, to perform operations comprising: the location fusion module receiving (a)(i) first radio signal location data for a first object from a radio sensor; and (a)(ii) first visual signal location data for the first object from a camera sensor; the feature extraction module performing feature extraction on (b)(i) the first radio signal location data to determine first extracted radio signal features; and (b)(ii) the first visual signal location data to determine first extracted visual signal features; the location fusion module solving a first association problem between the first extracted radio signal features and the first extracted visual signal features to determine first fused location data; and the location fusion module storing the first fused location data in the at least one computer readable storage medium.

The location fusion module or engine may include hardware (e.g., transistors, registers, field programmable gate arrays (FPAG)), software, firmware, or a combination configured (programmed or designed) to receive the location data and then associate the data to determine the fused location data. The extraction module or engine may include hardware (e.g., transistors, registers, FPAG), software, firmware, or a combination configured (programmed or designed) to extract features (e.g., trajectory) from location data. In an embodiment, the fusion module handles the actions addressed in portion 225 of FIG. 2.

In example 2c the subject matter of Example 1c can optionally include wherein the at least one processor is to perform operations comprising displaying a location of the first object based on the first fused location data.

In example 3c the subject matter of Examples 1c-2c can optionally include wherein the at least one processor is to perform operations comprising applying a particle filter to the first fused location data to determine first filtered fused location data.

In example 4c the subject matter of Examples 1c-3c can optionally include wherein the at least one processor is to perform operations comprising applying the particle filter to the first fused location data based on a site map for a physical site corresponding to the first radio signal location data, the first visual signal location data, and the first object.

In example 5c the subject matter of Examples 1c-4c can optionally include wherein the first radio signal location data and the first visual signal location data both correspond to a common coordinate system.

In example 6c the subject matter of Examples 1c-5c can optionally include wherein the first radio signal location data is time synchronized to the first visual signal location data.

In example 7c the subject matter of Examples 1c-6c can optionally include wherein the at least one processor is to perform operations comprising determining the first fused location data based on associating a first electronic identifier, corresponding to the first radio signal location data, with the first visual signal location data.

In example 8c the subject matter of Examples 1c-7c can optionally include wherein the at least one processor is to perform operations comprising performing the feature extraction to extract trajectory data for the first object based on the first visual signal location data; wherein the trajectory data is included in the first extracted radio signal features.

In example 9c the subject matter of Examples 1c-8c can optionally include wherein the at least one processor is to perform operations comprising receiving (a)(i) second radio signal location data for a second object from the radio sensor; and (a)(ii) second visual signal location data for the second object from the camera sensor; performing feature extraction on (b)(i) the second radio signal location data to determine second extracted radio signal features; and (b)(ii) the second visual signal location data to determine second extracted visual signal features; solving a second association problem between the second extracted radio signal features and the second extracted visual signal features to determine second fused location data; and storing the second fused location data in the at least one computer readable storage medium; wherein the first and second visual signal location data corresponds to a single frame of video data.

In example 10c the subject matter of Examples 1c-9c can optionally include wherein the at least one processor is to perform operations comprising reassigning a first electronic identifier from the second object to the first object based on the solving the first and second association problems.

In example 11c the subject matter of Examples 1c-10c can optionally include wherein the at least one processor is to perform operations comprising determining the first fused location data based on associating a first electronic identifier, corresponding to the first radio signal location data, with the first visual signal location data; and determining the second fused location data based on associating a second electronic identifier, corresponding to the second radio signal location data, with the second visual signal location data.

In example 12c the subject matter of Examples 1c-11c can optionally include wherein the at least one processor is to perform operations comprising conducting k-means clustering on video data corresponding to the first and second visual signal location data, wherein "k" is based on the first and second electronic identifiers.

In example 13c the subject matter of Examples 1c-12c can optionally include wherein the first and second visual signal location data correspond to an occlusion with one of the first and second objects occluding another of the first and second objects.

In example 14c the subject matter of Examples 1c-13c can optionally include wherein the first radio signal location data is based on at least one of received signal strength indicator (RSSI) fingerprinting, RSSI triangulation, and Time Of Flight trilateration.

In example 15c the subject matter of Examples 1c-14c can optionally include wherein the first radio signal location data includes first coordinate data and the first visual signal location data includes second coordinate data.

In example 16c the subject matter of Examples 1c-15c can optionally include wherein the first radio signal location data includes a first device identifier (ID) for the first object and a first time stamp and the first visual signal location data includes a second time stamp.

In example 17c the subject matter of Examples 1c-16c can optionally include wherein the at least one processor is to perform operations comprising solving the first association problem based on a least cost optimization between the first extracted radio signal features and the first extracted visual signal features.

In example 18c the subject matter of Examples 1c-17c can optionally include wherein the at least one processor is to perform operations comprising communicating a first message to a first mobile computing node in response to determining the first fused location data.

In example 19c the subject matter of Examples 1c-18c can optionally include wherein the first fused location data includes a first electronic identifier included in the first radio signal location data and first coordinate data included in the first visual signal location data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one storage device comprising instructions which, when executed, cause at least one processor to at least:
    access sensor data from an environmental sensor, the environmental sensor carried by a tracked object;
    identify image data from a camera system separate from the tracked object;
    fuse the image data from the camera system with the sensor data from the environmental sensor to generate localization information representing a location of the tracked object, the fusion of the image data and the sensor data based on a first timestamp associated with the image data substantially matching a second timestamp associated with the sensor data; and
    initiate upload of the localization information to a remote system for update of a map.

2. The at least one storage device of claim 1, wherein the tracked object is a moving object.

3. The at least one storage device of claim 1, wherein the camera system includes at least one stationary camera.

4. The at least one storage device of claim 1, wherein the environmental sensor is internal to the tracked object.

5. The at least one storage device of claim 1, wherein the camera system includes at least one monocular camera.

6. A system for localization of objects, the system comprising:
    an environmental sensor carried by a tracked object;
    a camera system separate from the tracked object;
    a transceiver;
    at least one processor;
    at least one memory including instructions which, when executed, cause the at least one processor to at least:
        identify sensor data from the environmental sensor;
        identify image data from the camera system;
        fuse the image data from the camera system with the sensor data from the environmental sensor to generate localization information representing a location of the tracked object, the fusion of the image data and the sensor data based on a first timestamp associated with the image data substantially matching a second timestamp associated with the sensor data; and
        initiate upload of the localization information via the transceiver to a remote system for update of a map.

7. The system of claim 6, wherein the transceiver is a wireless local area network transceiver.

8. The system of claim 6, wherein the camera system includes at least one monocular camera.

9. The system of claim 6, wherein the environmental sensor is to measure a signal received at the tracked object.

10. The system of claim 6, wherein the tracked object is a moving object.

11. The system of claim 6, wherein the localization information represents an orientation of the tracked object.

12. The system of claim 6, further including a display to present the map.

13. A method for localization of objects, the method comprising:
    identifying, by executing an instruction with at least one processor, sensor data from an environmental sensor, the environmental sensor carried by a tracked object;
    identifying, by executing an instruction with the at least one processor, image data from a camera system, the camera system separate from the tracked object;
    fusing, by executing an instruction with the at least one processor, the image data from the camera system with the sensor data from the environmental sensor to generate localization information representing a location of the tracked object, the fusion of the image data and the sensor data based on a first timestamp associated with the image data substantially matching a second timestamp associated with the sensor data; and
    initiating upload of the localization information to a remote system for update of a map.

14. The method of claim 13, further including calibrating timestamps associated with the image data.

15. The method of claim 14, wherein the calibrating of the timestamps is performed using a network time protocol.

16. The method of claim 13, further including calibrating timestamps associated with the sensor data.

17. The method of claim 13, wherein the camera system includes at least one monocular camera external to the object.

18. The method of claim 17, wherein the environmental sensor is internal to the tracked object.

19. An apparatus for localization of objects, the apparatus comprising:
    means for identifying environmental sensor data, the means for identifying the environmental sensor data carried by a tracked object;
    means for capturing image data, the means for capturing the image data separate from the tracked object;
    means for fusing the image data with the environmental sensor data to generate localization information representing a location of the tracked object, the means for fusing to fuse the image data and the environmental sensor data based on a first timestamp associated with the image data substantially matching a second timestamp associated with the environmental sensor data; and
    means for initiating upload of the localization information to a remote system for update of a map.

20. The apparatus of claim 19, wherein the means for capturing includes at least one stationary camera.

21. The apparatus of claim 19, wherein the means for identifying is internal to the tracked object.

22. The apparatus of claim 19, wherein the means for capturing includes at least one monocular camera.

* * * * *